(12) United States Patent
Matsui et al.

(10) Patent No.: US 8,616,872 B2
(45) Date of Patent: Dec. 31, 2013

(54) THREE-DIMENSIONAL MODELING APPARATUS, METHOD OF MANUFACTURING A THREE-DIMENSIONAL OBJECT AND THREE-DIMENSIONAL OBJECT

(75) Inventors: Takeshi Matsui, Tokyo (JP); Junichi Kuzusako, Saitama (JP); Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 12/929,247

(22) Filed: Jan. 11, 2011

(65) Prior Publication Data

US 2011/0190446 A1    Aug. 4, 2011

(30) Foreign Application Priority Data

Feb. 2, 2010   (JP) ................................. 2010-021139

(51) Int. Cl.
*B29C 67/00*   (2006.01)

(52) U.S. Cl.
USPC ............................ 425/375; 264/113; 264/308

(58) Field of Classification Search
USPC .................................. 425/375; 264/113, 308
See application file for complete search history.

(56) References Cited

U.S. PATENT DOCUMENTS

| 5,204,055 A | 4/1993 | Sachs et al. |
| 2004/0173946 A1* | 9/2004 | Pfeifer et al. ................. 264/497 |
| 2008/0001331 A1* | 1/2008 | Ederer .......................... 264/460 |

FOREIGN PATENT DOCUMENTS

JP    7-507508 T    8/1995

* cited by examiner

*Primary Examiner* — James Sanders
(74) *Attorney, Agent, or Firm* — Rader, Fishman & Grauer PLLC

(57) ABSTRACT

Provided is a three-dimensional modeling apparatus including a supply mechanism, a deposition area, a variable mechanism, a discharge mechanism, and a control means. The supply mechanism supplies a powder material. In the deposition area, the supplied powder material is deposited. The variable mechanism varies a volume of the deposition area per a predetermined layer thickness, and thus the powder material is deposited per the predetermined layer thickness in the deposition area. The discharge mechanism discharges liquid for forming a three-dimensional object to the deposited powder material, the liquid being capable of hardening the powder material. The control means causes the discharge mechanism to discharge the liquid to the powder material, to thereby form a main body being an object being as a target to be modeled and a frame body being an object to be formed in a periphery of the main body, of the three-dimensional object.

6 Claims, 16 Drawing Sheets

FIG.5A
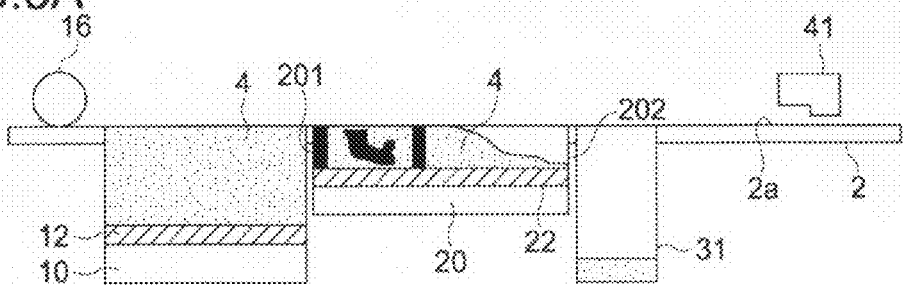
FIG.5B
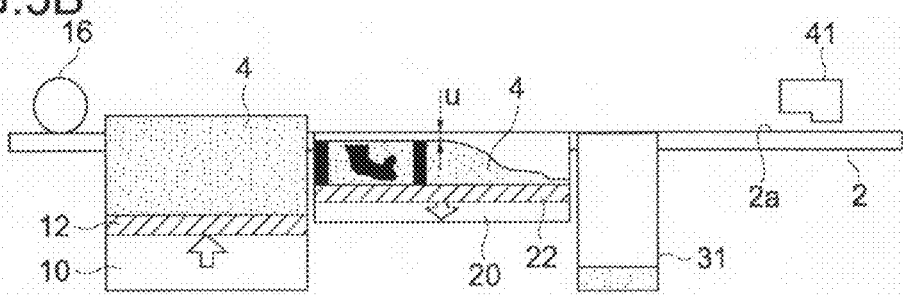
FIG.5C
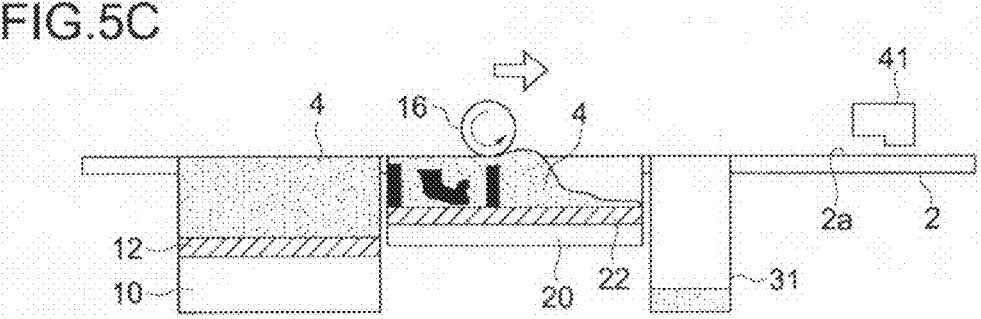
FIG.5D
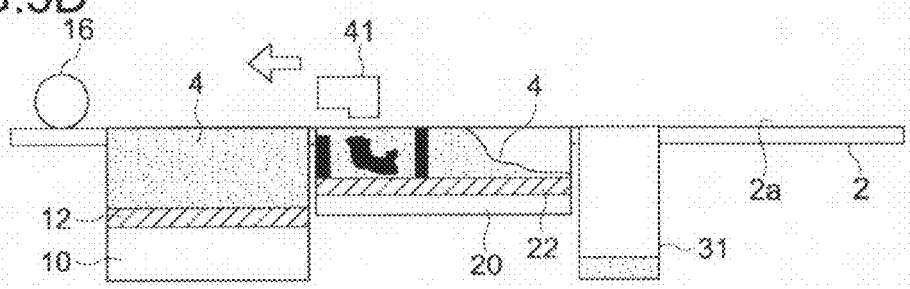
FIG.5

THREE-DIMENSIONAL MODELING APPARATUS, METHOD OF MANUFACTURING A THREE-DIMENSIONAL OBJECT AND THREE-DIMENSIONAL OBJECT

BACKGROUND OF THE INVENTION

1. Field of the Invention

The present invention relates to a three-dimensional modeling apparatus that forms a three-dimensional shape by laminating pieces of cross-sectional image data, and to a three-dimensional object manufactured by the three-dimensional modeling apparatus.

2. Description of the Related Art

In the past, a three-dimensional modeling apparatus of this type has been known as an apparatus of rapid prototyping, which is widespread for commercial use. As main methods for the three-dimensional modeling apparatus, stereo lithography, laminated object manufacturing, and modeling with powders, for example.

In the stereo lithography, light-curing resin is irradiated with high-power laser light to form a cross-sectional shape, and cross-sectional shapes are laminated, to thereby form a three-dimensional shape. In the laminated object manufacturing, thin sheets are cut out in a layer form, and the cutout sheets are bonded and laminated, to thereby form the three-dimensional shape. In the modeling with powders, powder materials are bedded in a layer form to form a cross-sectional shape, and cross-sectional shapes are laminated, to thereby form a three-dimensional shape.

In addition, the modeling with powders is roughly classified into a method in which powders are molten or sintered and a method in which powders are solidified by an adhesive. In the former method, nylon material is irradiated with laser light to form a cross-section, to thereby form a three-dimensional shape. In the latter method, powders, the main component of which is plaster, are solidified by discharging an adhesive thereto through an inkjet head used for a printing apparatus or the like, and cross-sectional layers are formed and laminated, to thereby form a three-dimensional shape.

In the modeling with powders by using the inkjet head, from the head of an inkjet printer, a binding solution for binding the powders is discharged, with the head being moved above a sheet on which the powdered plaster are bedded when printing is performed.

An apparatus using the above-mentioned modeling with powders is disclosed in Japanese Unexamined Patent Application Publication No. Hei 7-507508 (hereinafter, referred to as Patent Literature 1). As shown in FIG. 2 of Patent Literature 1, a head (41) (powder-dispersing head (13)) for discharging powders supplies the powders while moving above an area (form) (14 and 42) in which the powders are accommodated. Then, a head (43) (inkjet printing head (15)) for discharging binder materials for binding the powder particles to each other selectively discharges the binder materials to the powders while moving above the area (42). In this manner, a binder layer is formed (which is described at page 7 in specification of Patent Literature 1). Further, the above-mentioned apparatus has a structure in which, as shown in FIG. 7 of Patent Literature 1, a horizontal roller (101) for leveling a surface of the supplied powders also runs.

SUMMARY OF THE INVENTION

In the modeling apparatus using the modeling with powders as described above, the powders are evenly bedded in an entire box being the area in which the powders are accommodated, and an object is formed within the box. Thus, the volume of the powders, which have to be accommodated in the box, is larger than the volume of the formed object. In particular, as shown in FIG. 1 of Patent Literature 1, in the apparatus of forming a plurality of the same objects at a time within the box (form), the volume of the box is larger, and hence a larger amount of powders is necessary, and wasted powders is increased.

In view of the above-mentioned circumstances, there is a need for providing a three-dimensional modeling apparatus capable of reducing wasted powder materials, a method of manufacturing a three-dimensional object, and a three-dimensional object.

According to an embodiment of the present invention, there is provided a three-dimensional modeling apparatus including a supply mechanism, a deposition area, a variable mechanism, a discharge mechanism, and a control means.

The supply mechanism supplies a powder material.

The deposition area is an area in which the powder material supplied by the supply mechanism is deposited.

The variable mechanism varies a volume of the deposition area per a predetermined layer thickness so that the powder material is deposited per the predetermined layer thickness in the deposition area.

The discharge mechanism discharges liquid for forming a three-dimensional object to the powder material deposited per the predetermined layer thickness in the deposition area, the liquid being capable of hardening the powder material.

The control means causes the discharge mechanism to discharge the liquid to the powder material, to thereby form a main body being an object being as a target to be modeled and a frame body being an object to be formed in a periphery of the main body, of the three-dimensional object.

In the embodiment of the present invention, it is unnecessary for the powder material to be evenly bedded in the deposition area because it is sufficient that the powder material of an amount at least equal to the sum of the volume of the frame body itself and the volume within the frame body be supplied into the deposition area by the supply mechanism. Thus, it is possible to reduce the waste of the powder material.

The deposition area includes a first side, and a second side opposite to the first side. In this case, the supply mechanism may include a supply box and a conveying mechanism.

The supply box is arranged to be adjacent to the first side of the deposition area, and is capable of storing the powder material.

The conveying mechanism conveys the powder material stored in the supply box in such a manner that the powder material is more deposited in an area closer to the first side rather than the second side in an entire area of the deposition area.

In a case where the three-dimensional object including the main body and the frame body is formed in an area smaller than the entire area of the deposition area, it is sufficient that the powder material be supplied not to the entire area of the deposition area, but to an area (area closer to first side) of at least a part of the deposition area, which is an area in which the entire three-dimensional object is to be formed. In this case, the conveying mechanism is capable of conveying the powder material into the deposition area in such a manner that powder material is deposited more in an area closer to the supply box of the entire area of the deposition area.

The discharge mechanism may be capable of discharging ink of multiple colors as the liquid. In this case, the control means causes the discharge mechanism to discharge the ink of multiple colors to the powder material forming the frame body so that the frame body colored in the multiple colors is formed. With this, in such a manner that a worker or a computer recognizes the frame body colored in the multiple colors, it is possible to check whether ink of a desired color is discharged, or the like.

The control means may cause the discharge mechanism to discharge the liquid in such a manner that an outline of the frame body has an isotropic shape as viewed at least from a plane perpendicular to a direction in which the powder material is deposited. If the frame body is not formed and an original shape of the main body being the object does not have an isotropic shape, the completed main body may be strained. In the embodiment of the present invention, the frame body is formed, and hence it is possible to suppress the shape of the main body from being strained.

The control means may cause the discharge mechanism to discharge the liquid, to thereby form a plurality of objects each including the frame body.

The three-dimensional modeling apparatus may further include a camera configured to pick up an image of the formed frame body. For example, in such a manner that the worker views the image of the frame body picked up by the camera, it is possible to grasp a discharge state of the liquid. Alternatively, image information of the frame body may be fed back to the computer, to thereby perform an adjustment such as maintenance of the discharge mechanism for the liquid.

According to another embodiment of the present invention, there is provided a method of manufacturing a three-dimensional object. According to the method, a powder material is supplied into a deposition area.

A volume of the deposition area is varied per a predetermined layer thickness so that the powder material is deposited per the predetermined layer thickness in the deposition area.

Liquid for forming the three-dimensional object is discharged to the powder material deposited in the deposition area, to thereby form a main body being an object being as a target to be modeled and a frame body being an object to be formed in a periphery of the main body, of the three-dimensional object, the liquid being capable of hardening the powder material.

According to still another embodiment of the present invention, there is provided a three-dimensional object obtained by the above-mentioned manufacturing method.

According to still another embodiment of the present invention, there is provided a three-dimensional modeling apparatus including a supply mechanism, a deposition area, a variable mechanism, a discharge mechanism, and a control means.

The supply mechanism supplies a powder material.

The deposition area is an area in which the powder material supplied by the supply mechanism is deposited.

The variable mechanism varies a volume of the deposition area per a predetermined layer thickness so that the powder material is deposited per the predetermined layer thickness in the deposition area.

The discharge mechanism discharges liquid for forming a three-dimensional object to the powder material deposited per the predetermined layer thickness in the deposition area, the liquid being capable of hardening the powder material.

The control means causes the discharge mechanism to discharge the liquid to the powder material, to thereby form a main body being an object being as a target to be modeled and a partition body for partitioning the deposition area, of the three-dimensional object.

In the embodiment of the present invention, it is unnecessary for the powder materials to be evenly bedded in the deposition area because it is sufficient that the powder materials of an amount at least equal to the sum of the volume of the main body itself, the volume of the partition member itself, and the volume between the main body and the partition member be supplied into the deposition area by the supply mechanism. Thus, it is possible to reduce the waste of the powder material.

As described above, according to the embodiments of the present invention, it is possible to reduce the waste of the powder material.

BRIEF DESCRIPTION OF DRAWINGS

FIG. 5 are schematic views viewed from the side, which show mechanical operations of the 3-D modeling apparatus in order;

DESCRIPTION OF PREFERRED EMBODIMENTS

Hereinafter, embodiments of the present invention will be described with reference to the drawings.

[First Embodiment]

(Configuration of 3-D Modeling Apparatus)

Figure 1:
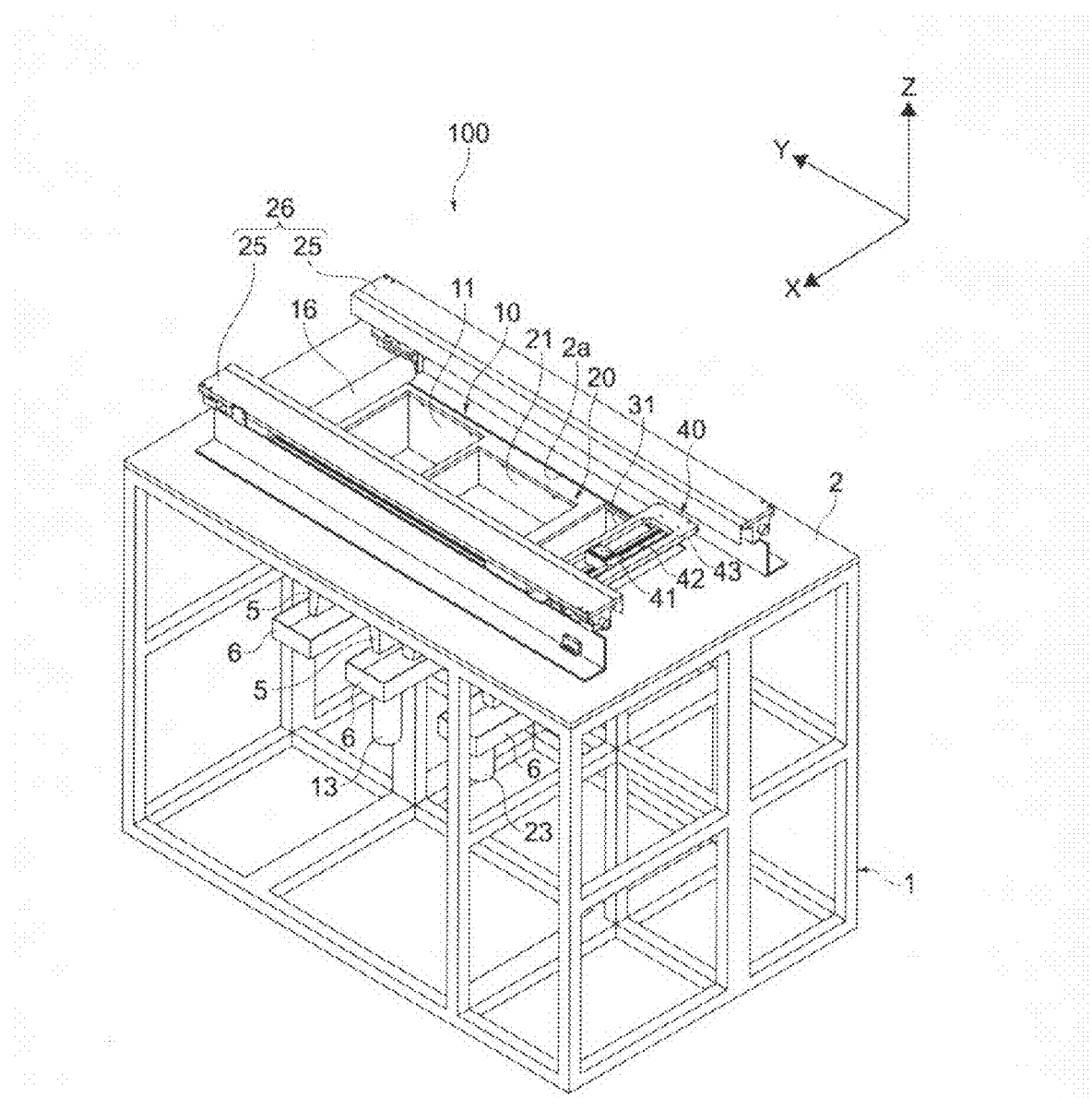
FIG. 1 is a perspective view showing a three-dimensional (hereinafter, abbreviated as 3-D) modeling apparatus according to a first embodiment of the present invention.
Figure 2:
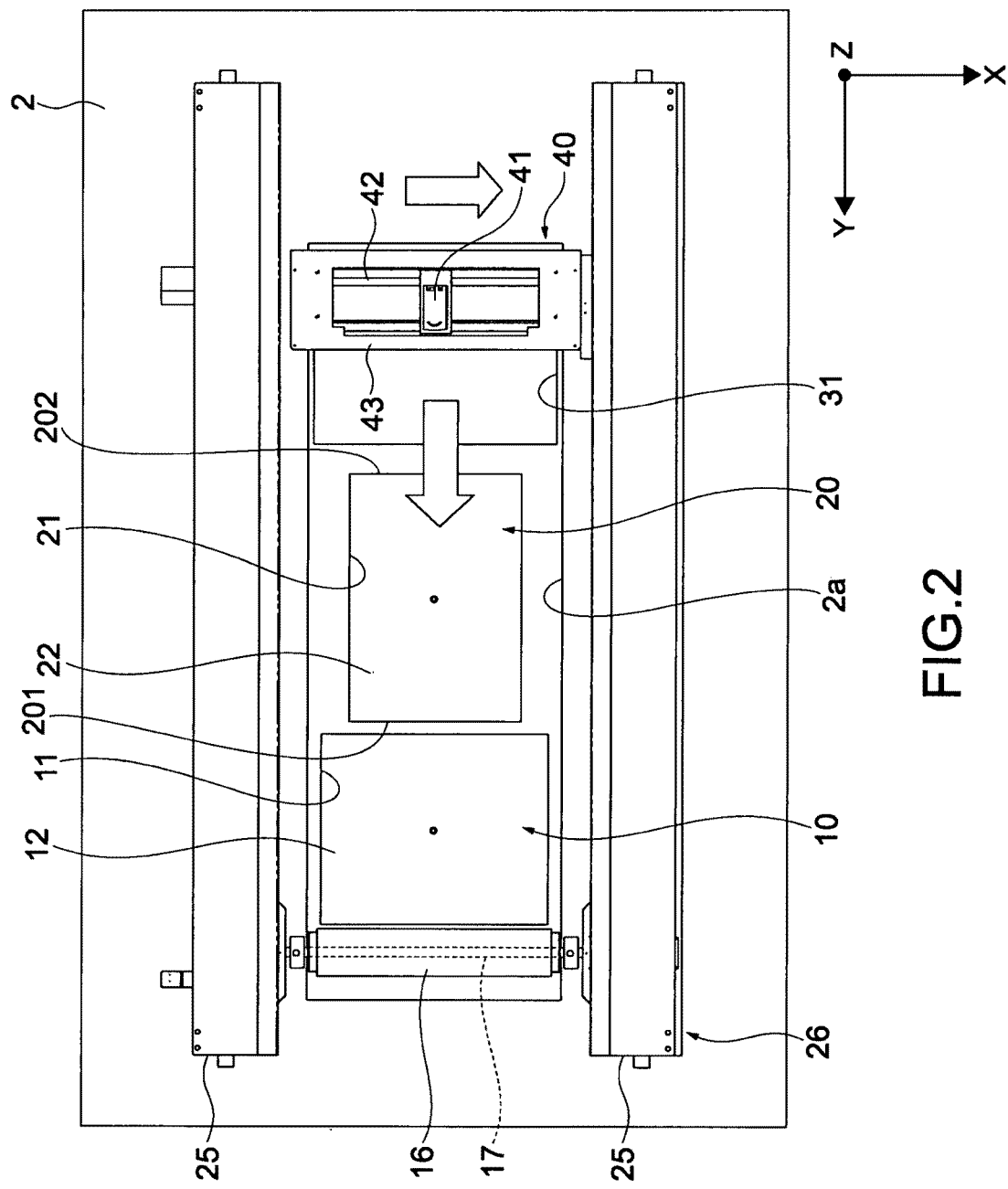
FIG. 2 is a plan view of the 3-D modeling apparatus shown in FIG. 1.
Figure 3:
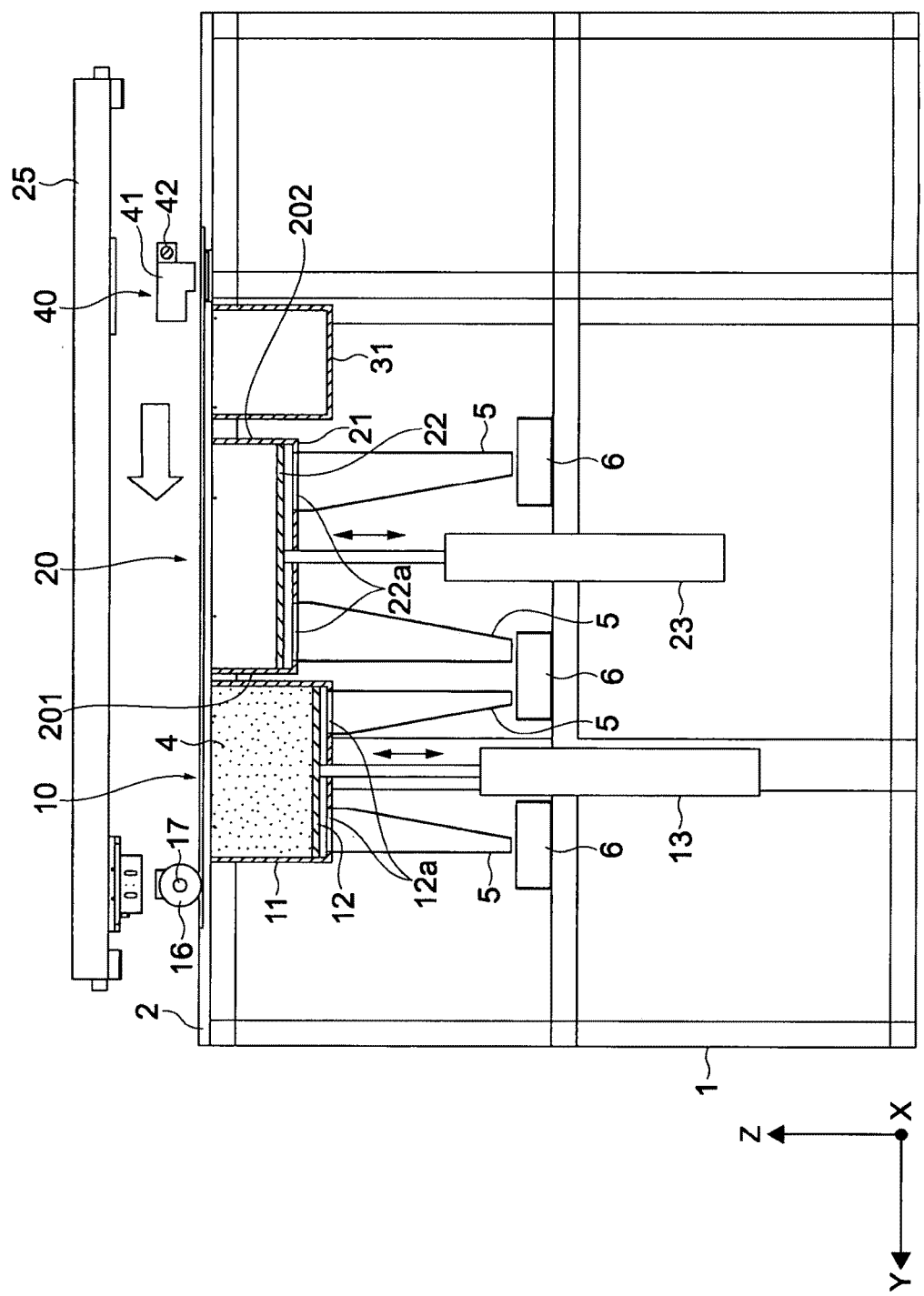
FIG. 3 is a side view of the 3-D modeling apparatus shown in FIG. 1.

FIG. 1 is a perspective view showing a 3-D modeling apparatus according to a first embodiment of the present invention. FIG. 2 is a plan view of the 3-D modeling apparatus 100 shown in FIG. 1. FIG. 3 is a side view of the 3-D modeling apparatus 100 shown in FIG. 1.

The 3-D modeling apparatus 100 includes a frame 1 having a cubic grid shape and a plate 2 fixed on the frame 1. In the center of the plate 2, there is formed an opening portion 2a for a modeling work. The opening portion 2a is formed along a Y direction being a longitudinal direction of the plate 2. Below the opening portion 2a, there are arranged a supply portion 10, a modeling portion 20, and a collecting box 31. The supply portion 10 serves as a mechanism of supplying powder materials (hereinafter, abbreviated as powders 4). In the modeling portion 20, an object made of the powders 4 is formed. The collecting box 31 collects the powders 4. As shown in FIG. 2 and FIG. 3, the supply portion 10, the modeling portion 20, and the collecting box 31 are arranged along the Y direction in the stated order from the left side of the drawings.

The supply portion 10 includes a supply box 11, a supply stage 12, and a lifting and lowering cylinder 13. The supply box 11 is capable of storing the powders 4 therein. The supply stage 12 is placed in the supply box 11, and pushes up the powders 4, which are stored in the supply box 11, from below, to thereby supply the powders 4 on the plate 2 through the opening portion 2a. The lifting and lowering cylinder 13 lifts and lowers the supply stage 12.

As the powders 4, for example, an inorganic material, such as salt, plaster, magnesium sulfate, calcium sulfate, magnesium chloride, potassium chloride, and sodium chloride, is used. A material obtained by mixing sodium chloride with bittern (magnesium sulfate, magnesium chloride, potassium chloride, or the like) may be used. That is, the material contains sodium chloride as the main component. Alternatively, it is also possible to use an organic material, such as polyvinylpyrrolidone, polyvinyl alcohol, carboxymethyl cellulose, ammonium polyacrylate, sodium polyacrylate, ammonium methacrylate, and sodium methacrylate, or a copolymer thereof. The average particle diameter of each of the powders 4 is typically 10 μm or more and 100 μm or less. The use of salt involves lower energy for extracting or processing the powder materials as compared to a case where powder materials such as metal and plastic are used, which is environmentally friendly. However, the metal and the plastic may be used as the powders.

The modeling portion 20 arranged to be adjacent to the supply portion 10 includes a modeling box 21, a modeling stage 22, and a lifting and lowering cylinder 23. The modeling box 21 is capable of storing the powders 4. The modeling stage 22 is placed in the modeling box 21, and has the powders 4 deposited thereon, and supports an object to be formed from below. The lifting and lowering cylinder 23 lifts and lowers the modeling stage 22. As the lifting and lowering cylinders 13 and 23, one that uses a voice coil motor or one that uses fluid pressure is used, for example. Considering the modeling stage 22 as a bottom, an area above the modeling stage 22 in the modeling box 21 is a deposited area in which the powders 4 are to be deposited.

As shown in FIG. 2, the modeling portion 20 includes a first side 201 and a second side 202 in opposite to the first side 201 in the Y direction. The modeling box 21 is positioned in such a manner that the first side 201 is adjacent to the supply portion 10.

As seen in FIG. 2, the length of the modeling box 21 in the X direction is set to range from 10 to 50 cm, and the length of the modeling box 21 in the Y direction is set to range from 20 to 100 cm. However, the length is not limited to the above-mentioned range.

In a bottom surface of the supply box 11, there are provided discharge ports 12a for discharging extra powders 4. In a bottom surface of the modeling box 21, there are provided discharge ports 22a for discharging extra powders 4. To the discharge ports 12a and 22a, members 5 are connected. The members 5 are configured to form discharge paths for the powders 4. Below the members 5, there are provided boxes 6, respectively. The boxes 6 collect the powders 4 discharged by self-weight of the powders 4 through the discharge ports 12a and 22a and the members 5 forming the discharge paths.

An upper portion of each of the boxes 11, 21, and 31 is opened. The open surfaces of the upper portions are arranged to face the opening portion 2a of the plate 2.

In vicinity of an end portion, which is on a side of the supply portion 10, of the opening portion 2a of the plate 2, there is provided a roller 16. The roller 16 serves as a conveying mechanism configured to convey the powders 4, which are supplied from the supply portion 10, to the modeling portion 20. The roller 16 has a rotational axis 17. The rotational axis 17 is provided along a direction, which is, in a horizontal plane, orthogonal to a direction in which the respective boxes 11, 21, 31 are arranged, that is, the X direction. Further, on the plate 2, there is provided a moving mechanism 26. The moving mechanism 26 causes the roller 16 to move to the Y direction.

Figure 4:
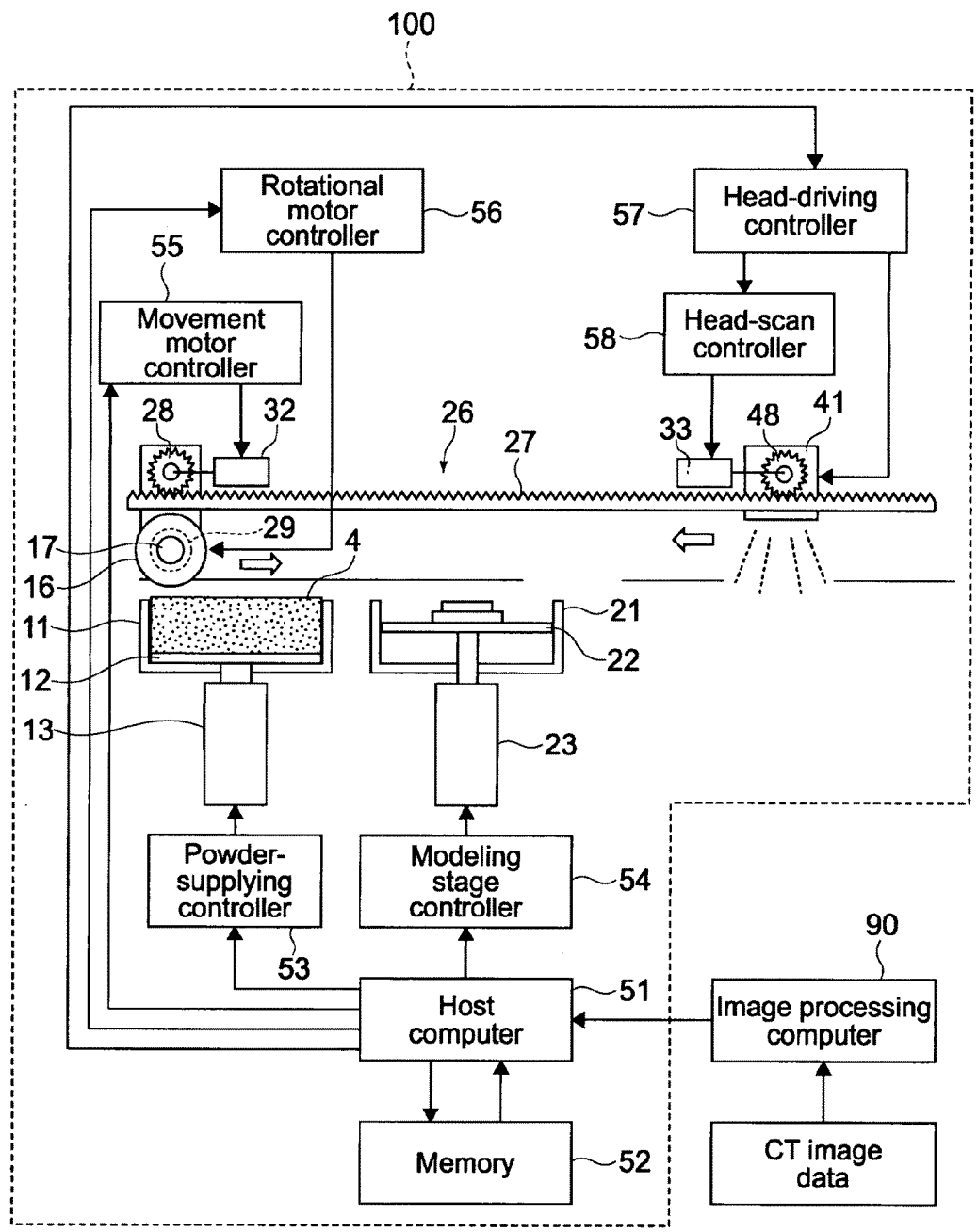
FIG. 4 is a block diagram mainly showing a configuration of a control system for the 3-D modeling apparatus.

The moving mechanism 26 includes guide rails 25 and a drive mechanism. The guide rails 25 are provided on both sides in the X direction of the opening portion 2a so as to extend along the Y direction. The drive mechanisms are arranged in upper portions of the guide rails 25, respectively. As the drive mechanism, drive mechanism using a rack and pinion system is used, for example. In this case, as shown in FIG. 4, each of the drive mechanisms includes a movement motor 32, a gear 28 driven by the movement motor 32, and a rack gear 27 engaged with the gear 28. The rack gear 27 is arranged at an appropriate position on each of the guide rails 25 or the plate 2.

Further, as shown in FIG. 4, the 3-D modeling apparatus 100 includes a rotational motor 29 configured to rotate the roller 16. In order to rotate the roller 16, the following setting is possible. Specifically, in the setting, driving force by the movement motor 32 may be transmitted to the rotational axis 17 of the roller 16 via a gear or the like (not shown).

The above-mentioned drive mechanism is not limited to the rack and pinion drive mechanism. As the drive mechanism, a ball-screw drive mechanism, a belt drive mechanism, a chain drive mechanism, a linear drive mechanism using electromagnetic action or static electrical action may be used.

Further, there is provided an inkjet head 41. The inkjet head 41 serves as a discharge mechanism capable of discharging ink to the powders 4 on the modeling stage 22 in the modeling portion 20. The inkjet head 41 is provided so as to be movable on the plate 2. The inkjet head 41 is installed in a drive unit 40 connected to the moving mechanism 26. The drive unit 40 is provided so as to be movable to the Y direction through the moving mechanism 26. For example, as shown in FIG. 4, the drive unit 40 is moved to the Y direction through a Y-direction movement motor 33, a gear 48 driven by the Y-direction movement motor 33, and the above-mentioned rack gears 27. With the above-mentioned configuration, the inkjet head 41 is allowed to perform a scanning movement in a X-Y plane above the opening portion 2a of the plate 2.

As shown in FIG. 1 to FIG. 3, the drive unit 40 includes a moving body 43 and a ball screw 42 installed on the moving body 43. The inkjet head 41 is allowed by the ball screw 42 to move on the moving body 43 to the X direction. The drive unit 40 may include other drive mechanisms described above in a place of the ball screw drive mechanism.

In regard to the inkjet head 41, it is sufficient to use one that has a configuration and a function similar to those of the typical inkjet head 41 for printing. As an inkjet-generating mechanism, there are exemplified a piezo element and a thermal element. The inkjet head 41 is capable of discharging ink of respective colors such as cyan, magenta, and yellow (hereinafter, referred to as CMY). In other words, the inkjet head 41 is capable of discharging color ink.

As the ink material, for example, aqueous-based ink is used, and commercially available ink for an inkjet printer may also be used. Ink into which PVP (polyvinylpyrrolidone) being an adhesive is mixed may be used as the ink. The ink may be oil-based ink in accordance with the material of the powders 4. Colorless ink may be also used. As the colorless ink, for example, a material obtained by mixing ethyl alcohol with pure water at a weight ratio of 1 to 1, a material obtained by mixing glycerin into pure water by approximately 5 wt % to 20 wt %, or a material obtained by mixing a minute amount of surfactants into the above-mentioned mixture materials is used.

In this embodiment, materials for the ink and the powders 4 are selected so that the powders 4 are solidified (that is, the powder particles are coupled to each other) due to moisture contained in the ink, for example.

FIG. 4 is a block diagram mainly showing a control system of the 3-D modeling apparatus 100.

The control system is provided with a host computer 51, a memory 52, an image processing computer 90, a powder-supplying controller 53, a modeling stage controller 54, a rotational motor controller 56, a movement motor controller 55, a head-driving controller 57, and a head-scan controller 58.

The host computer 51 performs overall control of drives of various controllers and the memory 52. The memory 52 is connected to the host computer 51, and may be volatile or nonvolatile.

The image processing computer 90 loads a CT (Computed Tomography) image data as a tomographic image of an object to be modeled as will be described later. An image processing such as a conversion into a BMP (bitmap) format is performed with respect to the CT image data. Typically, the image processing computer 90 is a computer separate from the 3-D modeling apparatus 100, and is connected to the host computer 51 with a USB (Universal Serial Bus), for example, to transmit to the host computer 51 the stored image data, which has been subjected to the image processing.

The form of the connection between the host computer 51 and the image processing computer 90 is not limited to the USB, but may be an SCSI (Small Computer System Interface) or another form. In addition, it makes no difference whether a wired connection or a wireless connection is used. It should be noted that the image processing computer 90 may be a device for image processing, which is provided in the 3-D modeling apparatus 100. Further, in the case where the image processing computer 90 is separate from the 3-D modeling apparatus 100, the image processing computer 90 may be integrated with a CT apparatus.

The powder-supplying controller 53 controls a lifting and lowering amount of the lifting and lowering cylinder 13 in order to control an amount of the powders 4, which are deposited on the plate 2 through the opening portion 2a of the plate 2, through controlling a lifting and lowering drive of the supply stage 12.

The modeling stage controller 54 controls the lifting and lowering amount of the lifting and lowering cylinder 23 in order to lower the modeling stage 22 per a predetermined height unit every time when a printing operation with respect to the powders 4 of one layer is performed by the inkjet head 41, which will be described later.

The head-driving controller 57 outputs a signal for driving the head in the X-Y plane, to the head-scan controller 58. Further, in order to control a discharging amount of ink of each color, the head-driving controller 57 outputs a driving signal to the inkjet-generating mechanism in the inkjet head 41.

The head-scan controller 58 controls a drive of the motor for driving the above-mentioned ball-screw drive mechanism in the X direction, which is installed in the Y-direction movement motor 33 and the drive unit 40.

The host computer 51, the image processing computer 90, the modeling stage controller 54, the powder-supplying controller 53, the rotational motor controller 56, the movement motor controller 55, the head-driving controller 57, and the head-scan controller 58 only have to be implemented by the following hardware or by the hardware and software in combination. The hardware is configured to be a part or an entire portion of the control means. Examples of the hardware include a CPU (Central Processing Unit), a DSP (Digital Signal Processor), an FPGA (Field Programmable Gate Array), an ASIC (Application Specific Integrated Circuit), and the like.

The memory 52 may be a storage device such as a magnetic disk and an optical disk, in addition to a solid (semiconductor, dielectric, or magnetoresistive) memory.

(Operations of 3-D Modeling Apparatus)

The description will be made of operations of the 3-D modeling apparatus 100 (and image processing computer 90) configured in the above-mentioned manner.

The image processing computer 90 reads the CT image data being data of the tomographic image of an object to be modeled, for example. The CT image data is, in a medical field, handled as DICOM (Digital Imaging and Communication in Medicine) data, typically. The CT is not limited to a CT captured through using an X ray, and means a broad CT including an SPECT (Single Photon Emission CT), a PET (Positron Emission Tomography), an MRI (Magnetic Resonance Imaging), or the like.

The CT image data, which is read by the image processing computer 90, is subjected to a predetermined processing such as a bit-mapping in colors, to thereby generate the above-mentioned DICOM data. The DICOM data is read in the host computer 51. At a time of generating the bit-mapped image data or the DICOM data, a worker may freely perform a selection of colors. For example, in a case where an object to be modeled is a part of a human body, such as an organ, it is possible to set the color for veins to be red, the color of fat to be yellow, or the like. In the 3-D modeling apparatus 100, a 3-D object 60 having a plurality of colors corresponding to the image data is formed. Alternatively, the bit-mapped image data is generated in binary of black and white or in gray scale. The host computer 51 operates the 3-D modeling apparatus 100 in the following manner based on an image for one layer according to the DICOM data.

FIGS. 5 are schematic views viewed from the side, which show mechanical operations of the above-mentioned 3-D modeling apparatus 100 in order. FIG. 5(A) to FIG. 5(D) show, as will be described later, processes in which one layer (predetermined layer thickness) of the powders 4 to be hardened when ink is discharged thereto is formed. The powders 4 and the unhardened powders 4 are illustrated in dotted hatching, and the hardened powders are painted black in the drawings.

Figure 6:
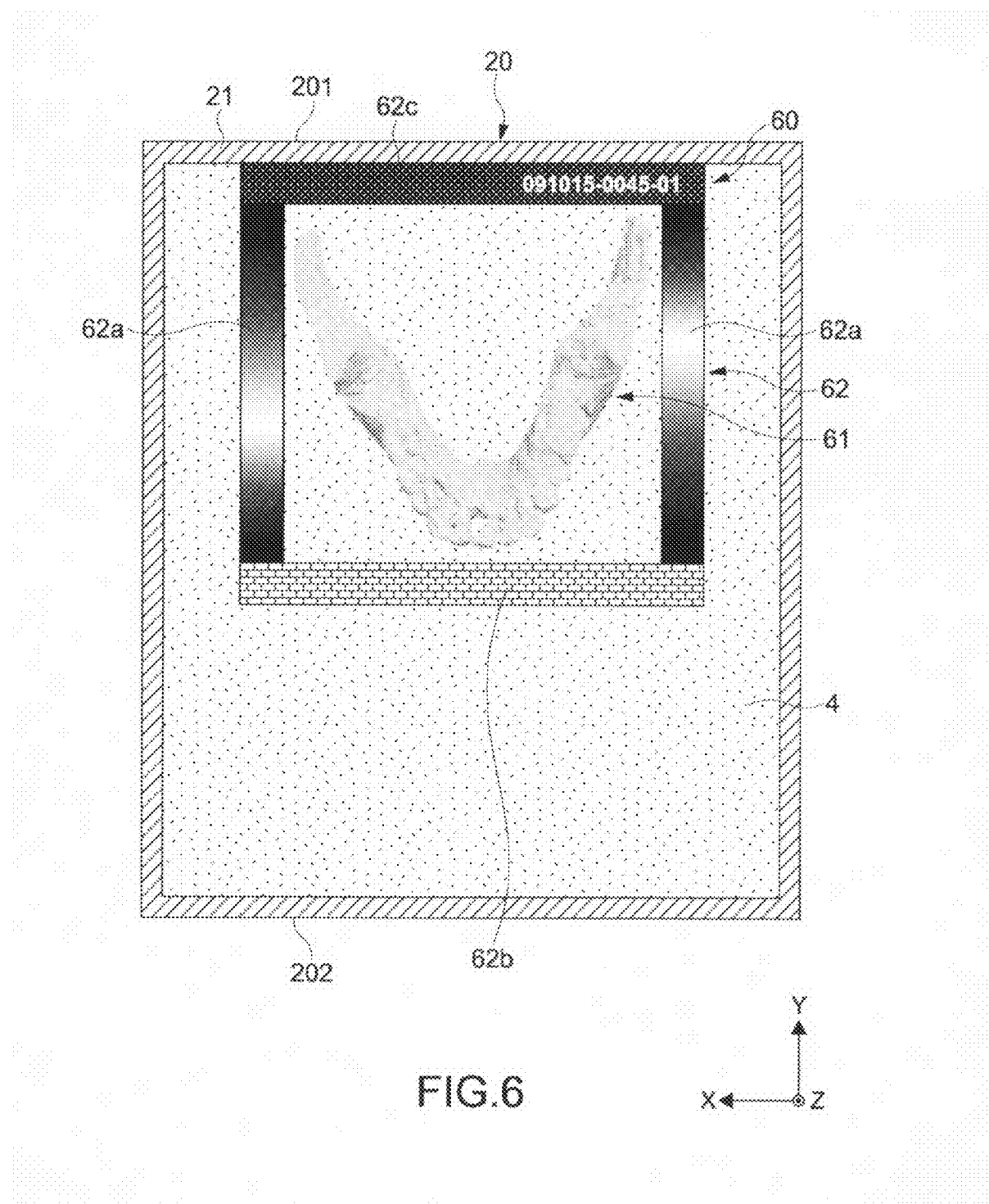
FIG. 6 is a plan view showing a 3-D object in a modeling box, which is formed by the 3-D modeling apparatus.
Figure 7:
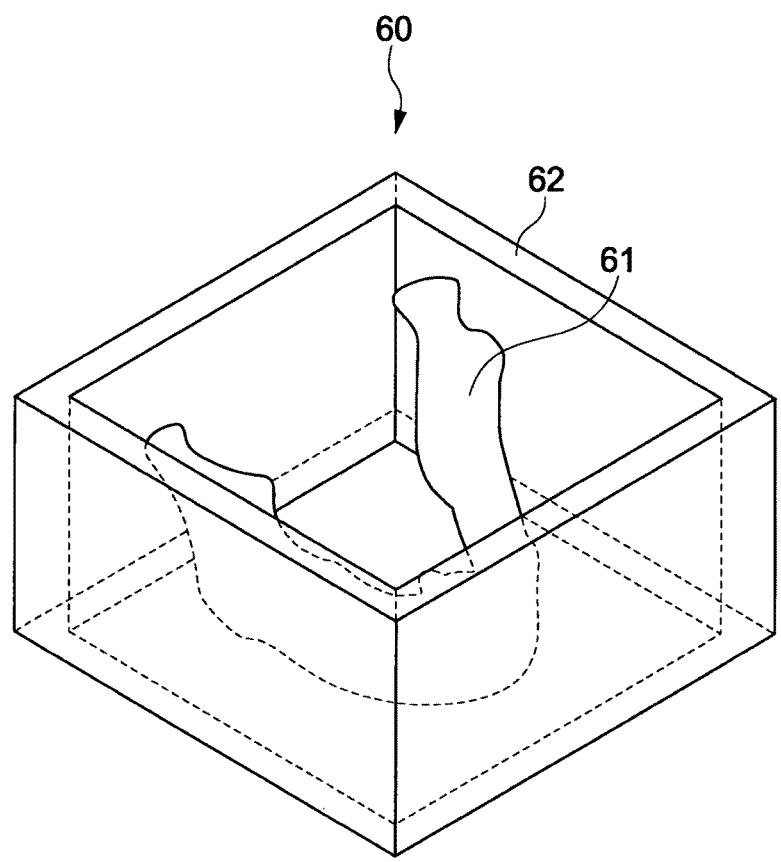
FIG. 7 is a perspective view of the 3-D object shown in FIG. 6.

FIG. 6 is a plan view showing the 3-D object in the modeling box 21, which is formed by the 3-D modeling apparatus 100. FIG. 7 is a perspective view of the 3-D object 60 shown in FIG. 6. As shown in FIG. 6 and FIG. 7, in this embodiment, a main body 61 and a frame body 62 are formed. The main body 61 is an object being as a target to be modeled, and the frame body 62 is an object to be formed in a periphery of the main body 61. In the example shown in FIG. 6, the object being as a target to be modeled is a human jawbone. The frame body 62 is formed into a shape set by the host computer 51 in advance. In this embodiment, the frame body 62 is one that does not have an upper wall nor a bottom wall, but four sidewalls, and that has an outline having a rectangular parallelepiped shape.

Further, the frame body 62 viewed from the X-Y plane has an isotropy (isotropic shape). Here, "having an isotropy" means having, when two orthogonal straight lines in the X-Y plane being at least one surface is set to be axes, axisymmetric shape with respect to each of the axes. For example, the two straight lines are axes respectively extending along both of the X direction and the Y direction, but are not limited thereto. The isotropy is similarly applied to the Y-Z plane and the Z-X plane. The frame body 62 shown in FIG. 6 has substantially a square shape, for example. The shape in at least one plane of the frame body 62 has an isotropy as described above, and hence it is possible to suppress the shape of the main body 61 from being strained, which will be described later.

In this embodiment, as shown in FIG. 5(A) to FIG. 5(D), in such a manner that in an entire area of the modeling stage 22 and the modeling box 21, more powders 4 are deposited in the first side 201 than in the second side 202, the powders 4 are conveyed into the modeling box 21 through the roller 16. This is to decrease a use amount of powders 4 as much as possible. With this, the 3-D object 60 including the main body 61 and the frame body 62 is formed on a side closer to the supply portion 10 in an entire deposition area within the modeling box 21, where the powders 4 are deposited.

As shown in FIG. 5(A), in the modeling stage 22 of the modeling portion 20, layers each including the hardened powders and the unhardened powders are laminated. In this state, a process of forming one layer is started. In FIG. 5(A), a position in which the roller 16 is illustrated, and a position in which the inkjet head 41 is illustrated are standby portions for each of them.

First, as shown FIG. 5(B), the powders 4 deposited on the supply stage 12 of the supply portion 10 are pushed up by the lifting and lowering cylinder 13. Then, the powders 4 of an amount slightly larger than an amount necessary for forming one powder layer are supplied until the powders 4 are deposited up to a position higher than a position of an upper surface of the plate 2. Further, in the modeling portion 20, when the modeling stage 22 is lowered, a space having a thickness for one powder layer (including hardened powders) is formed between a top surface of the uppermost layer of the layers each including the hardened powders and the unhardened powders and the upper surface of the plate. In this case, for example, the modeling stage controller 54 and the lifting and lowering cylinder 23 function as variable mechanisms configured to vary a volume of the deposition area where the powders 4 are deposited.

In FIG. 5(B), a thickness u for one powder layer is set to be equal to 1 mm being a pitch of laminated pieces of CT image data, or is set to 1/10 (0.1 mm) less than 1 mm. However, the thickness is not limited thereto. In a case where the thickness for one powder layer is set to be less than the pitch of the pieces of CT image data, the image processing computer 90 may generate, through software for executing a process such as interpolation based on the CT image data, one piece of DICOM data or a plurality of pieces of DICOM data, which is (are) formed between pieces of the CT image data of two layers.

As shown in FIG. 5(C), the roller 16 moves to the white arrow direction in FIG. 5(C), and rotates in a counter clock wise direction at the same time. In this manner, the powders 4 supplied from the supply portion 10 are conveyed. Here, the rotating direction of the roller 16 is a direction opposite to a direction to which the roller 16 would rotate due to frictional force between the roller 16 and the modeling portion 20 if the roller 16 is moved to the white arrow direction in such a manner that the roller 16 is set to be rotatable (the rotational force actuating on the rotational axis of the roller 16 is set to be free). The powders 4 are conveyed due to the above-mentioned rotation of the roller 16, and hence a powder layer of powders 4 evenly dispersed are formed in the space formed on the top surface of the uppermost layer of the layers each including the hardened powders and the unhardened powders in the modeling portion 20 in such a manner that the powders 4 are evenly dispersed at least in an area where the 3-D object 60 is formed.

As shown in FIG. 5(D), the inkjet head 41 discharges ink while moving as if the inkjet head 41 draws a colored image, in conjunction with an operation in which the roller 16 passes over the modeling portion 20, discharges extra powders 4 into the collecting box 31, and returns its standby position. In this case, the head-driving controller 57 or the like selectively discharges the ink through the inkjet head 41 to the powder layer according to instruction from the host computer 51 so as to form the main body 61 and the frame body 62. With this, the ink infiltrates into the powder layer, and then the powders 4 to which the ink is discharged adhere to each other. As a result, one layer including the hardened powders is formed.

It should be noted that after the roller 16 finishes conveying the powders 4 and then returns to its standby position, the head-driving controller 57 may start the movement of the inkjet head 41 so as to start to discharge the ink. However, as described above, a time period for the returning operation of the roller 16 and a time period the movement operation of the head are overlapped, and hence it is possible to reduce a processing time period.

When the inkjet head 41 returns in its standby position, an object corresponding to colored DICOM image data for one layer is formed, returning to the same state as that shown in FIG. 5(A). Then, a multiple-valued image for a subsequent image is drawn in the powders 4 through the operations shown in FIG. 5(B) to FIG. 5(C), and one layer including the hardened powders is laminated. Through the above-mentioned operations, the 3-D object 60 including the frame body 62 can be formed.

Figure 8A:
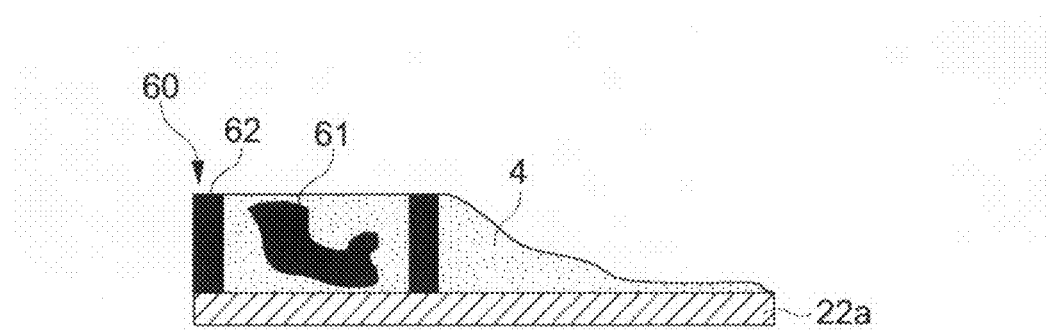
FIG. 8(A) to FIG. 8(D) are views showing procedures in which a user removes the object from the 3-D modeling apparatus after the object is formed.
Figure 8B:
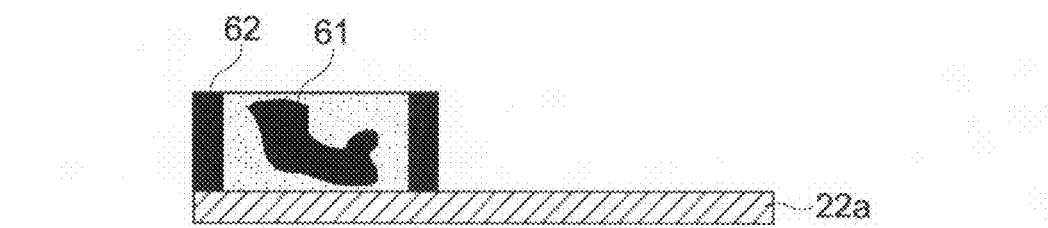
Figure 8C:
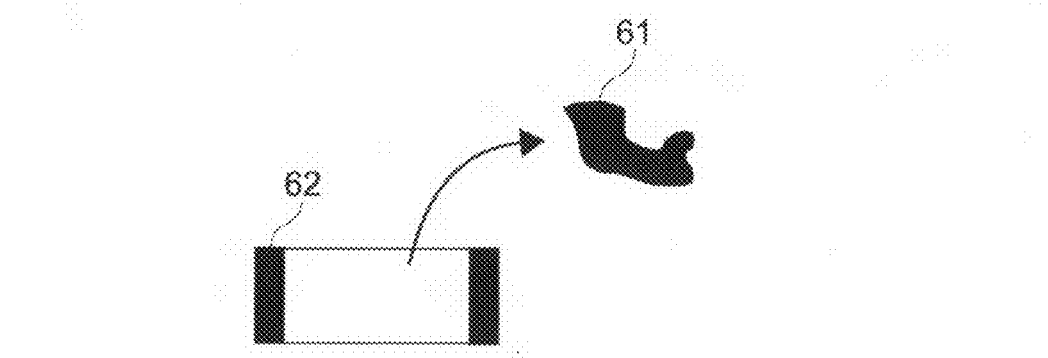

After the 3-D object 60 is formed, the worker performs procedures in order shown in FIG. 8(A) to FIG. 8(D). As shown in FIG. 8(A), the worker removes the 3-D object 60 including the main body 61 and the frame body 62 together with the plate 22a of the modeling stage 22 from the modeling box 21. It should be noted that the plate 22a may be separate from the modeling stage 22, the plate may be placed on the modeling stage 22, and the 3-D object 60 may be formed on the plate. The worker removes, as shown in FIG. 8(B), extra powders 4 remained in an outside of the frame body 62, and heats the 3-D object 60 including the main body 61 and the frame body 62 together with the plate 22a by use of a heating processing apparatus (not shown). Then, as shown in FIG.

Figure 8D:
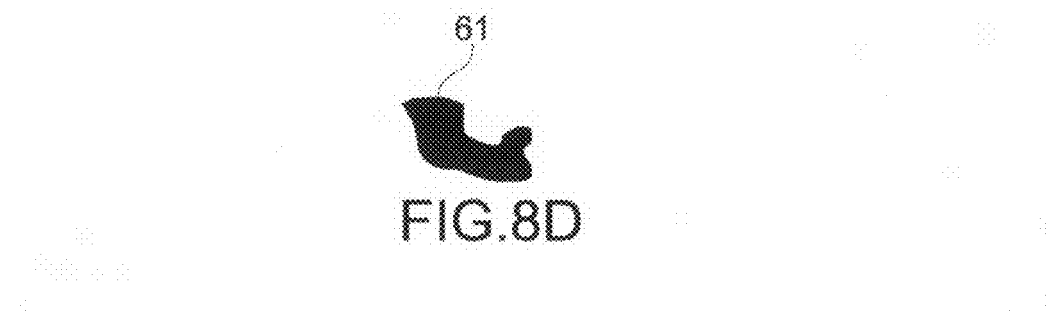

8(C) and FIG. 8(D), the worker separates the frame body 62 and the main body 61 from each other. Through the above-mentioned heating processing, moisture contained in object is evaporated. Thus, it is possible to obtain the object having increased hardness.

It should be noted that in this embodiment, the color ink is discharged, and hence the powders 4 are colored with a result that the colored 3-D object 60 is formed. When each of areas of the 3-D object 60 can be colored with a different color, convenience can be increased. Specifically, it is possible to easily observe each area of the completed 3-D object 60, for example. The areas of the 3-D object 60 means not only surface areas of the 3-D object 60, but also inside areas of the 3-D object 60.

As described above, in this embodiment, not only the main body 61, but also the frame body 62 are formed as a part of the 3-D object 60. With this, it is unnecessary for the powders 4 to be evenly bedded in the modeling box 21 because it is sufficient that the powders 4 of an amount at least equal to the sum of the volume of the frame body 62 and the volume within the frame body 62 be supplied onto the modeling stage 22. Thus, it is possible to reduce wasted powders 4.

Figure 19:
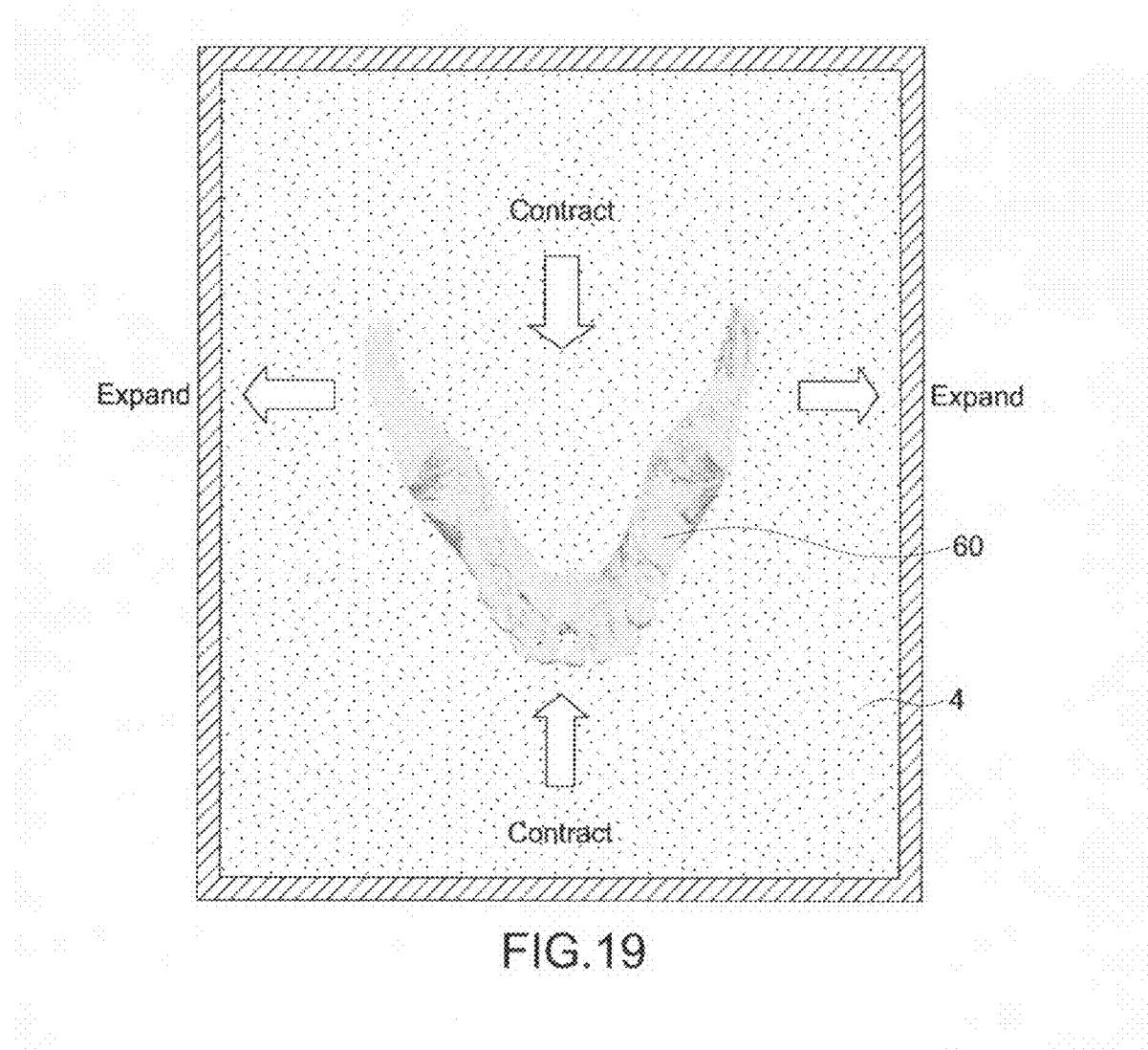
FIG. 19 is a view for describing directions to which the main body is strained in a case where no frame body is formed.

Further, the outline of the frame body 62 has an isotropy, and hence the following effects can be obtained. If the frame body 62 is not formed and an original shape of the main body 61 does not have an isotropic shape, the shape of the main body 61 may be strained in a state in which the main body 61 is stretched and contracted, for example, as shown in FIG. 19. That is because that when the main body 61 is subjected to the heating processing, the heat is differently transmitted to each portion of the main body 61. In this embodiment, however, the frame body 62 having an isotropic outline is formed, and hence the heat is evenly transmitted. Thus, it is possible to suppress generation of force causing the expansion and contraction, and to suppress the shape of the main body 61 from being strained.

In this embodiment, it is unnecessary to evenly supply the powders 4 so as to be deposited up to the second side 202 of the modeling portion 20, and it is unnecessary for the roller 16 to move up to the second side 202. Thus, it is possible to reduce a moving time period of the roller 16. As a result, it is possible to reduce a time period necessary for forming the 3-D object 60. Several hundreds of layers each including hardened powders, though depending on thickness of one layer, are necessary to form one 3-D object 60, and hence, when the processing time period for one layer can be reduced if only a little, it can be said that great merit can be obtained.

In this embodiment, the frame body 62 having a simple shape such as a rectangular parallelepiped shape or a cubic shape is formed, and hence the size of the formed object (frame body 62) is easily measured. Further, the above-mentioned structure facilitates a control of the size of the main body 61.

In this embodiment, the frame body 62 is formed and the 3-D object 60 including the main body 61 and the frame body 62 is formed on the side closer to the first side 201 of the modeling portion 20, and hence the following merit can be obtained. Specifically, it is possible to decrease the volume of the collecting box 31, or to make the collecting box 31 unnecessary. With this, it is possible to downsize the 3-D modeling apparatus 100. That is, it is possible to reduce the amount of the powders 4 at the area closer to the second side 202 within the modeling box 21 as compared to other areas. Thus, the amount of the powders 4 to be collected into the collecting box 31 is also reduced. With this, it is possible to decrease the volume of the collecting box 31, or to make the collecting box 31 unnecessary.

In this embodiment, also in parts of the frame body 62, colored areas are formed. In the example shown in FIG. 6, two sidewalls 62a along the Y direction of the frame body 62 are colored. In this case, it is sufficient to color entire two sidewalls 62a or an upper layer portion in the Z direction (top surface portion having a predetermined thickness). The above-mentioned colored sidewalls 62a function as color bars. That is, the worker can perform a color adjustment of the ink for the inkjet head 41 while viewing the above-mentioned color bars. Although in order to utilize the function as the color bar, it is desirable to color the frame body 62 in all colors to be used, it is possible to color the frame body 62 in some of the all colors to be used.

Figure 9:
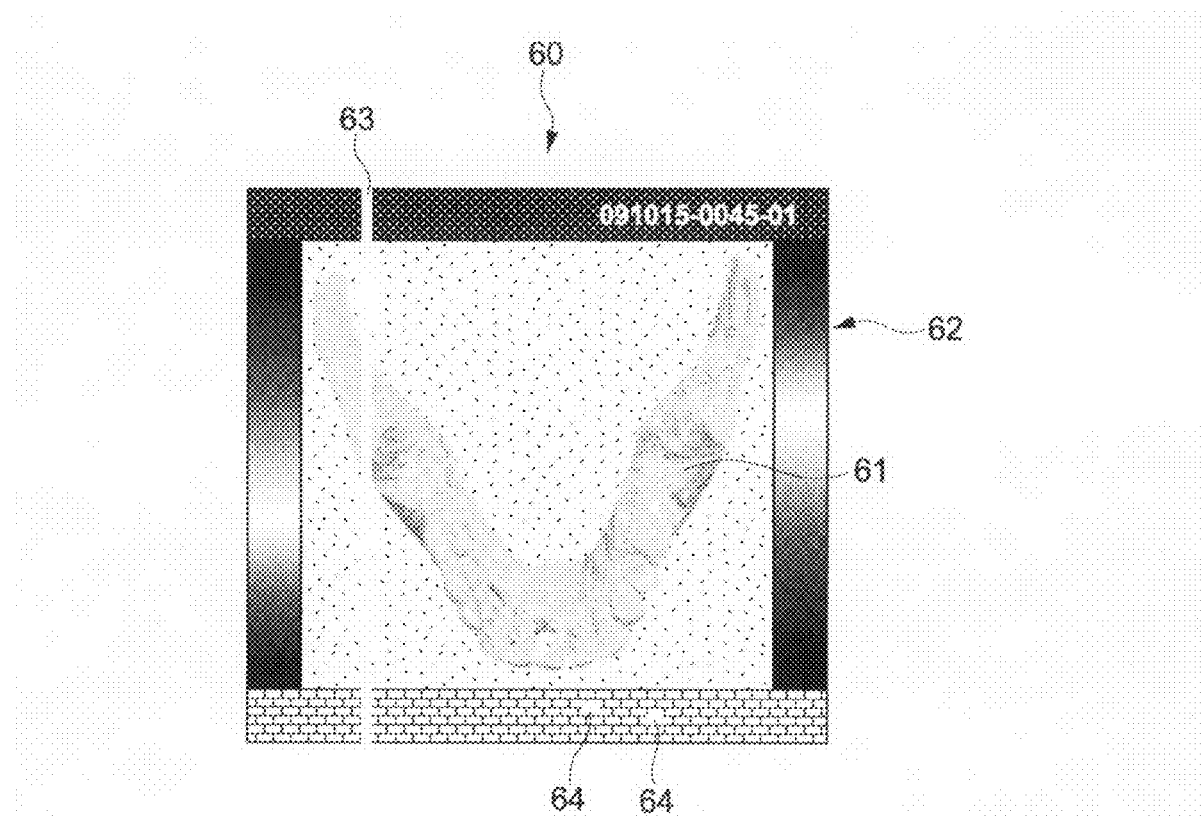
FIG. 9 is a view showing an example of an object formed due to defective discharging by an inkjet head.

Further, in this embodiment, as shown in FIG. 6, of two sidewalls 62b and 62c along the X direction of the frame body 62, figures, patterns, or the like are printed in one sidewall 62b in a predetermined continuous pattern. For example, as shown in FIG. 9, when the worker observes the continuous pattern, the worker easily can find defective discharging by the inkjet head 41, such as point faults 64 or line fault 63. The point faults 64 and the line fault 63 are faults in which the ink is lacked in a point and line state, respectively. When the defective discharging of the ink occurs, there is a fear that the 3-D object 60 may be split or chip.

Further, in this embodiment, as shown in FIG. 6, of the two sidewalls 62b and 62c along the X direction of the frame body 62, management numbers for (main body 61 of) the 3-D object 60 are printed on the sidewall 62c. With this, the management of the 3-D object 60 becomes easy. The printing of management numbers is effective also in a case where a plurality of objects 60 are formed within one modeling box 21 as will be described later.

The two sidewalls 62b and 62c along the X direction of the frame body 62 may be colored in one color. In this case, it is sufficient to use a relatively dark color.

[Second Embodiment]

Figure 10:
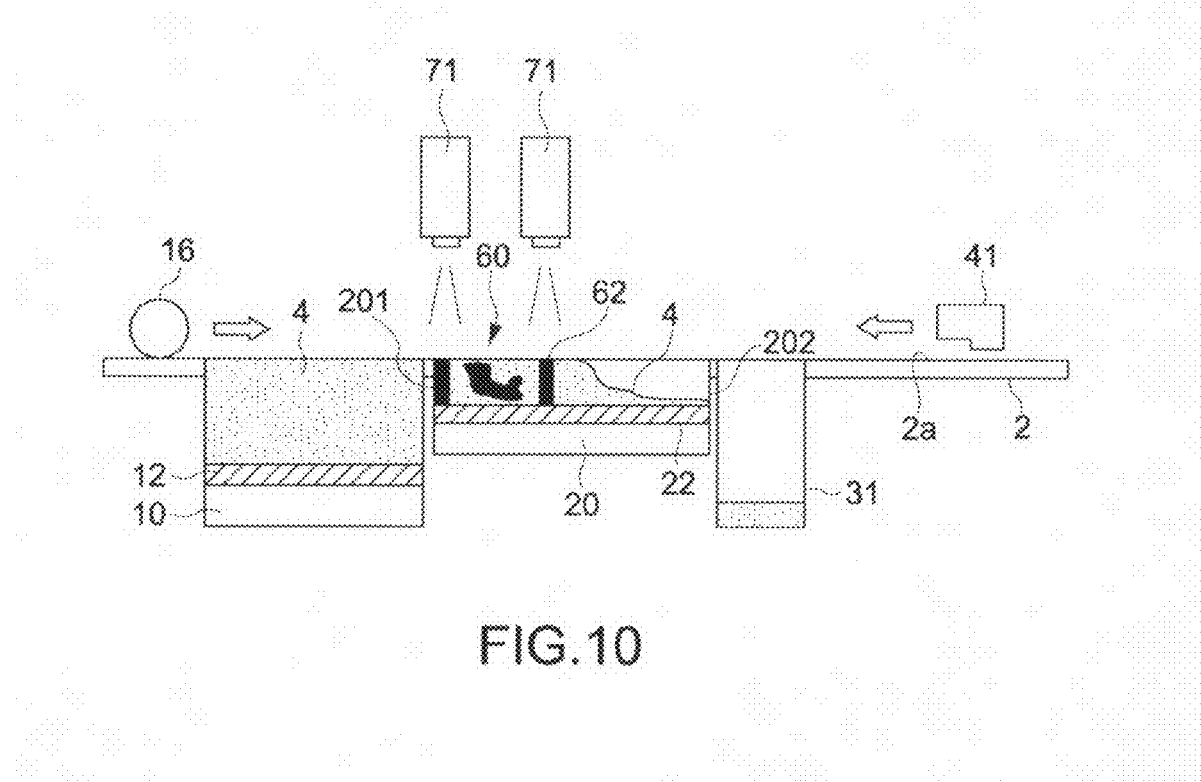
FIG. 10 is a view schematically showing a part of a 3-D modeling apparatus according to a second embodiment of the present invention.

FIG. 10 is a view schematically showing a part of a 3-D modeling apparatus according to a second embodiment of the present invention. In the following, the descriptions of the same members, functions, and the like as those included in the 3-D modeling apparatus 100 according to the embodiment shown in FIG. 1 and the like will be simplified or omitted, and different points will be mainly described.

The 3-D modeling apparatus according to this embodiment includes cameras 71. The cameras 71 are arranged above the modeling portion 20. The cameras 71 each include a CCD (Charge Coupled Device) and a photoelectric conversion element such as a CMOS (Complementary Metal-Oxide Semiconductor) (those are not shown). Although a plurality of, for example, two cameras 71 may be used as shown in FIG. 10, one camera may be used.

Each of the cameras 71 picks up at least images of the frame body 62 formed as the part of the 3-D object 60, and sends data of the image to the host computer 51. The host computer 51 analyzes the image data so as to recognize the point faults 64 and the line fault 63 described above. Based on the information of the analyzing result, the worker or the host computer 51 can perform an adjustment such as maintenance of the ink-supplying apparatus including the inkjet head 41.

In comparison with a case where each of the cameras 71 picks up images of only the main body 61 so as to recognize the point faults 64 and the line fault 63, the point faults 64 and the line fault 63 are more clearly found in the case of picking up images of the frame body 62 so as to recognize the point faults 64 and the line fault 63. Thus, in this case, it is possible to enhance the accuracy of the recognition.

[Other Embodiments Regarding Shape of Frame Body 62 and the Like]

Figure 11:
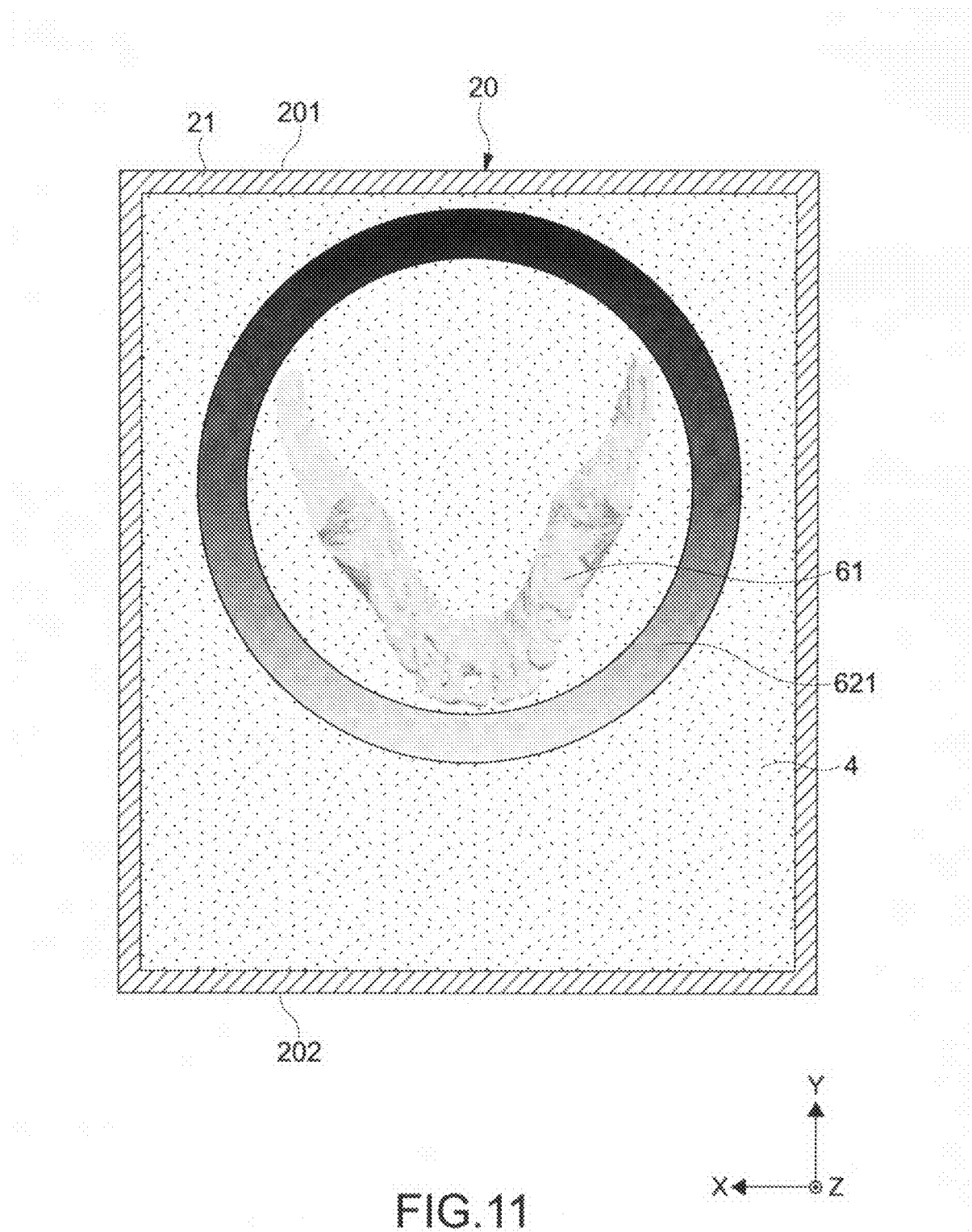
FIG. 11 is a plan view for describing another embodiment of a shape of a frame body.

FIG. 11 is a view for describing another embodiment of the shape of the frame body. A frame body 621 according to this embodiment has a cylindrical shape having no upper wall and no bottom wall. In this case, the shape viewed from the Y-Z plane (or Z-X plane) is rectangular or square. The frame body 621 has a function as a color bar similarly to the frame body 62 of the above-mentioned embodiment. Even with the above-mentioned shape of the frame body 621, the same effects as in the above-mentioned embodiment can be obtained.

Figure 12:
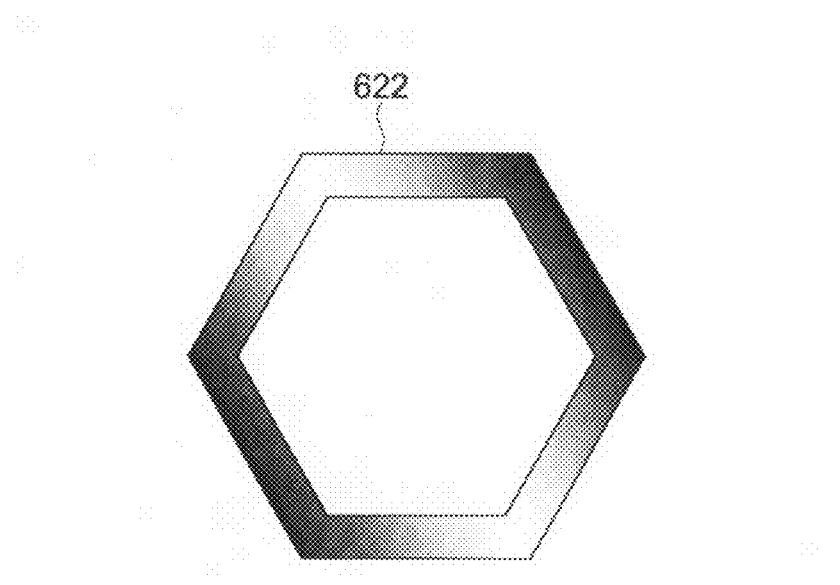
FIG. 12 is a plan view showing still another embodiment of the shape of the frame body.
Figure 13:
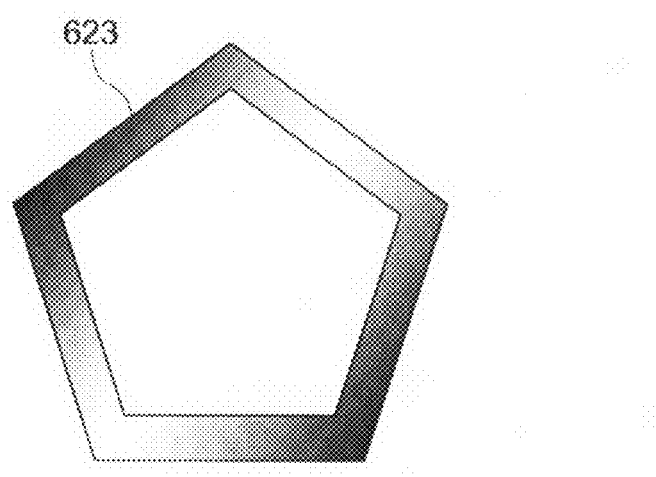
FIG. 13 is a plan view showing still another embodiment of the shape of the frame body.
Figure 14A:
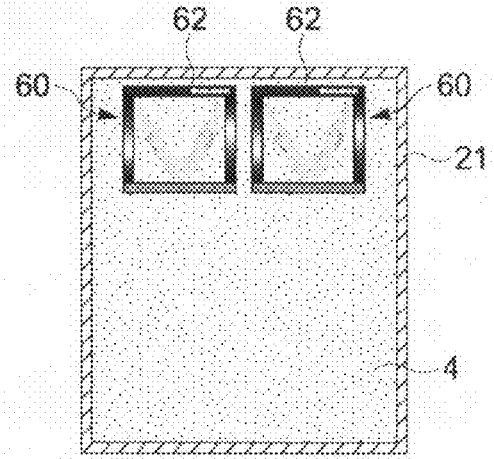
FIG. 14(A) to FIG. 14(E) are plan views each showing an example in which a plurality of objects including main bodies and square frame bodies are formed by use of one modeling box.
Figure 14D:
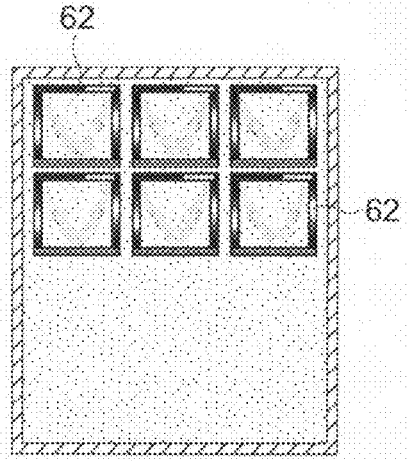
Figure 14B:
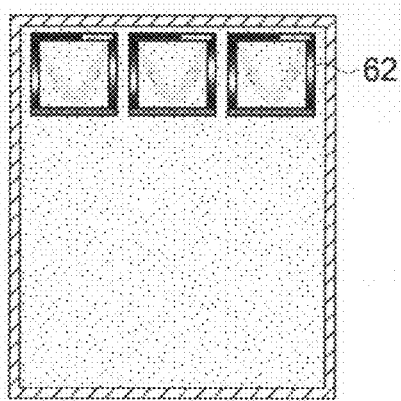
Figure 14E:
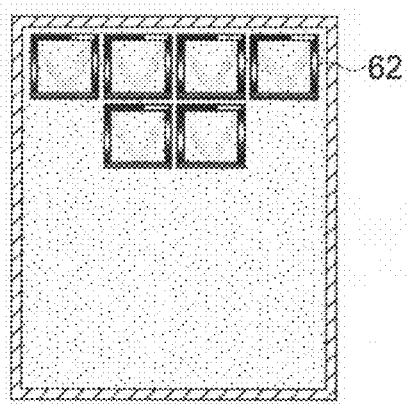
Figure 14C:
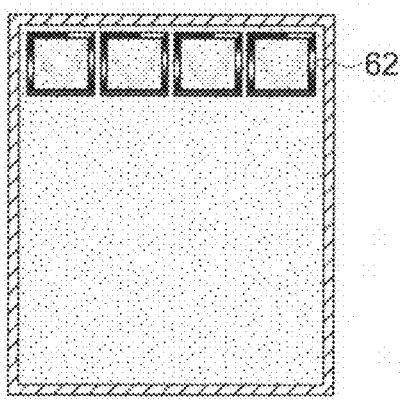

A frame body 622 shown in FIG. 12 as another embodiment has a regular hexagon shape as viewed in the X-Y plane. A frame body 623 shown in FIG. 13 as still another embodiment has a regular pentagon shape as viewed in the X-Y plane. A frame body 62 having a regular triangle shape, a regular octagon shape, or another polygonal shape other than the regular hexagon shape and the regular pentagon shape can be realized.

[Other Embodiments Regarding Number of Frame Bodies and Arrangement on Modeling Stage]

As shown in FIG. 14(A) to FIG. 14(E), on one modeling stage (within one modeling box 21), it is possible to form a plurality of objects each including the main body 61 and the rectangular frame body 62. Even in each of those embodiments, the plurality of objects are formed in an area closer to the first side 201. Further, even regarding the arrangement form of each of the objects, various forms can be achieved as shown in FIG. 14(A) to FIG. 14(E).

Figure 15A:
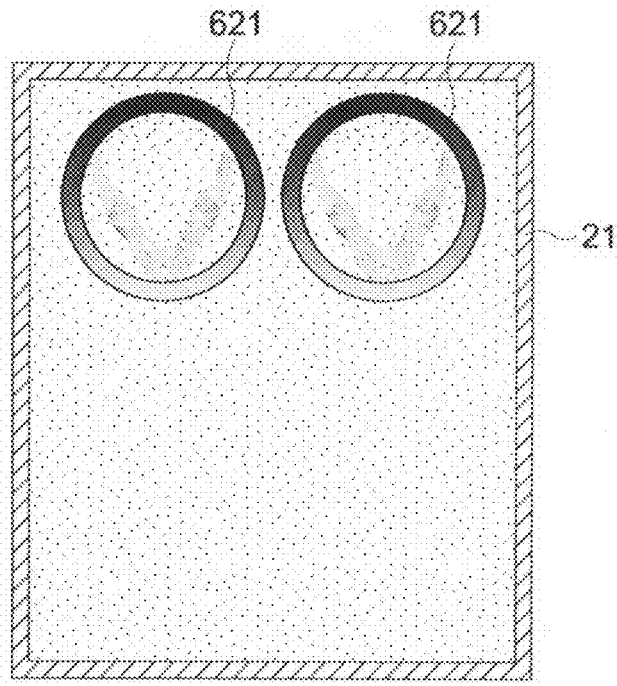
FIG. 15(A) and FIG. 15(B) are plan views showing an arrangement of frame bodies according to still another embodiment.
Figure 15B:
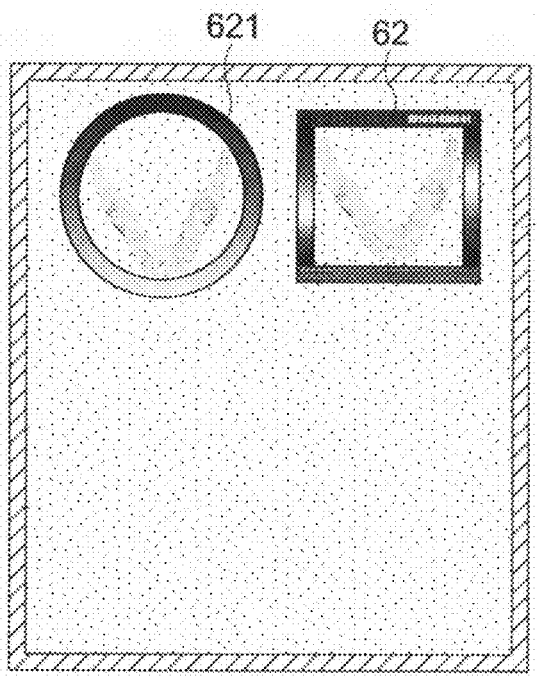

In an embodiment shown in FIG. 15(A), a plurality of objects, for example, two objects each including cylindrical frame bodies 621 are formed. In an embodiment shown in FIG. 15(B), a plurality of objects each including the frame body 62 and the frame body 621 are formed, the frame bodies 621 having different shapes from each other. The shape, the number, and the arrangement of the objects in the embodiments in FIG. 15(A) and FIG. 15(B) can be appropriately changed as shown in FIG. 12(A), FIG. 12(B), and FIG. 14(B) to FIG. 14(E).

[Still Another Embodiment Regarding Shape of Frame Body and the Like]

(Example 1)

Figure 16:
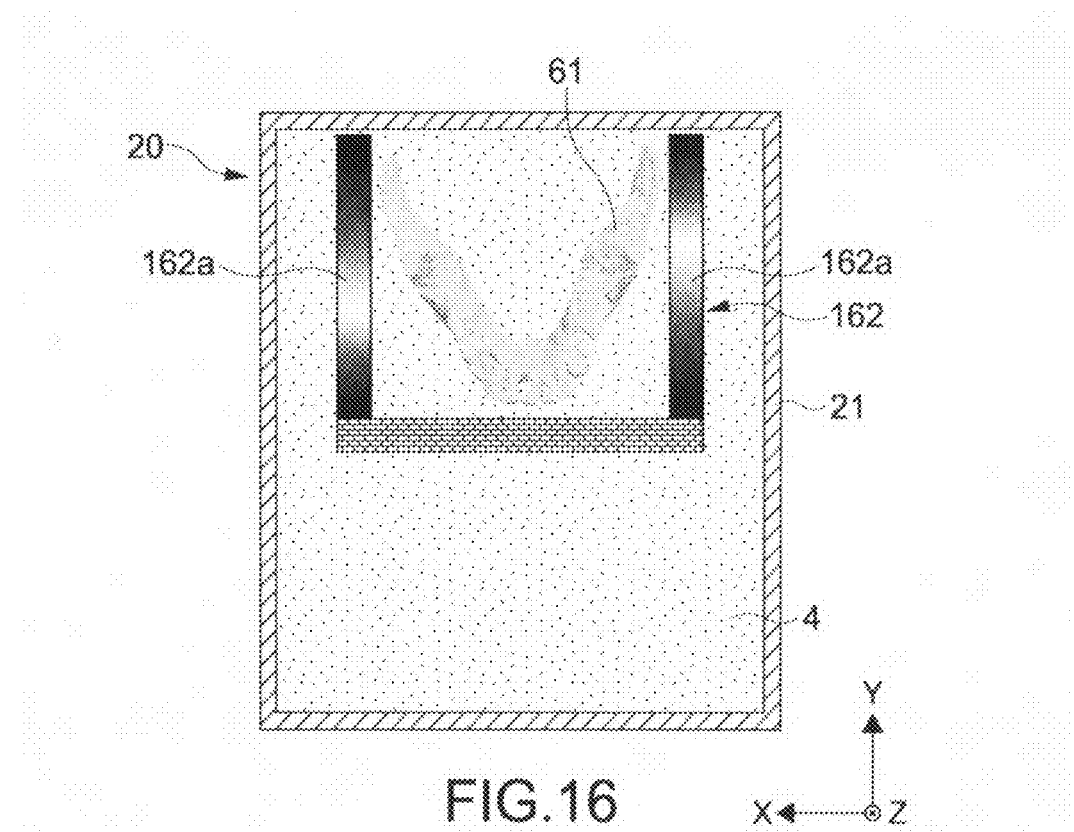
FIG. 16 is a plan view showing a frame body partially including sidewalls.

A body frame 162 according to an embodiment shown in FIG. 16 does not have a sidewall of sidewalls, which is closer to the first side 201 of the modeling portion 20. Instead, the body frame 162 has two sidewalls 162a along the Y direction. Ends of the two sidewalls 162a are formed in an abutting state against a wall of the modeling box 21. When an object is formed, the above-mentioned wall of the modeling box 21 functions as being a part of the body frame 162.

(Example 2)

Figure 17:
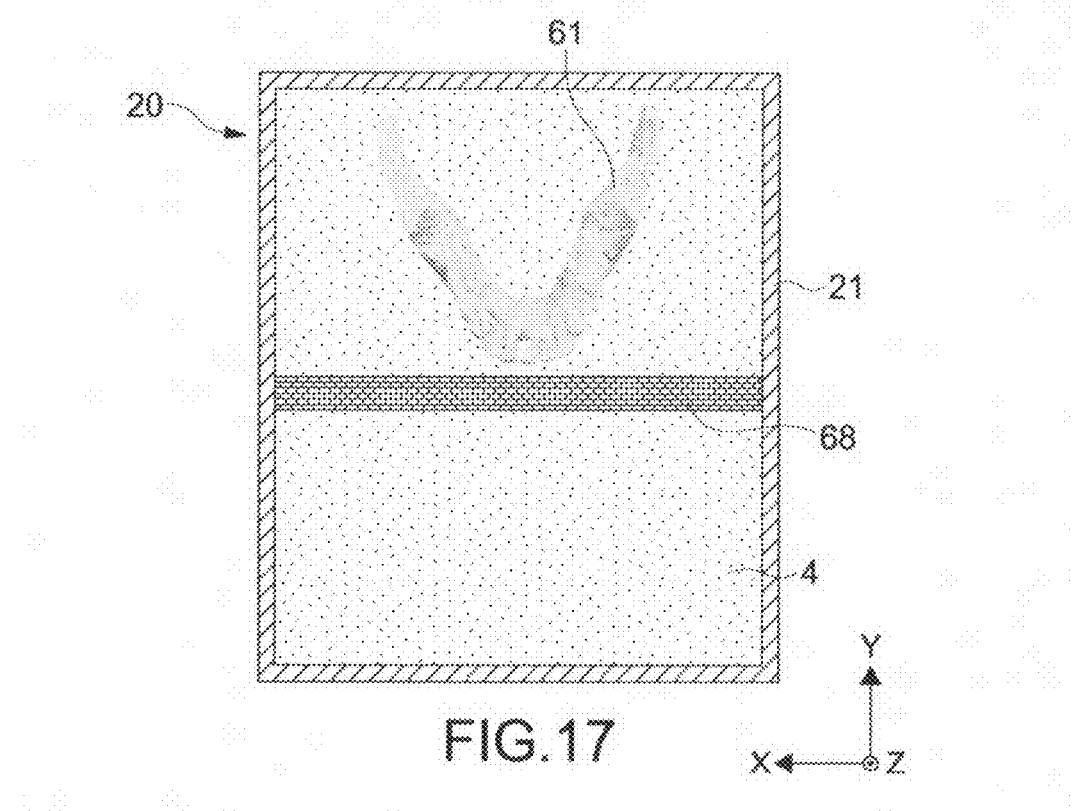
FIG. 17 is a plan view showing an example in which a partition body as an object is formed in place of the frame body described in each of the embodiments.

In FIG. 17, in a place of the frame body described in each of the above-mentioned embodiments, the deposition area within the modeling box 21 is partitioned by a partition body 68. In this case, the partition body 68 is formed as an object to be modeled. The partition body 68 can be also variously changed in the color, the pattern, the shape, the number, the arrangement, and the like similarly to the frame body according to each of the above-mentioned embodiments.

[Three-Dimensional Modeling Apparatus According to Third Embodiment]

Figure 18:
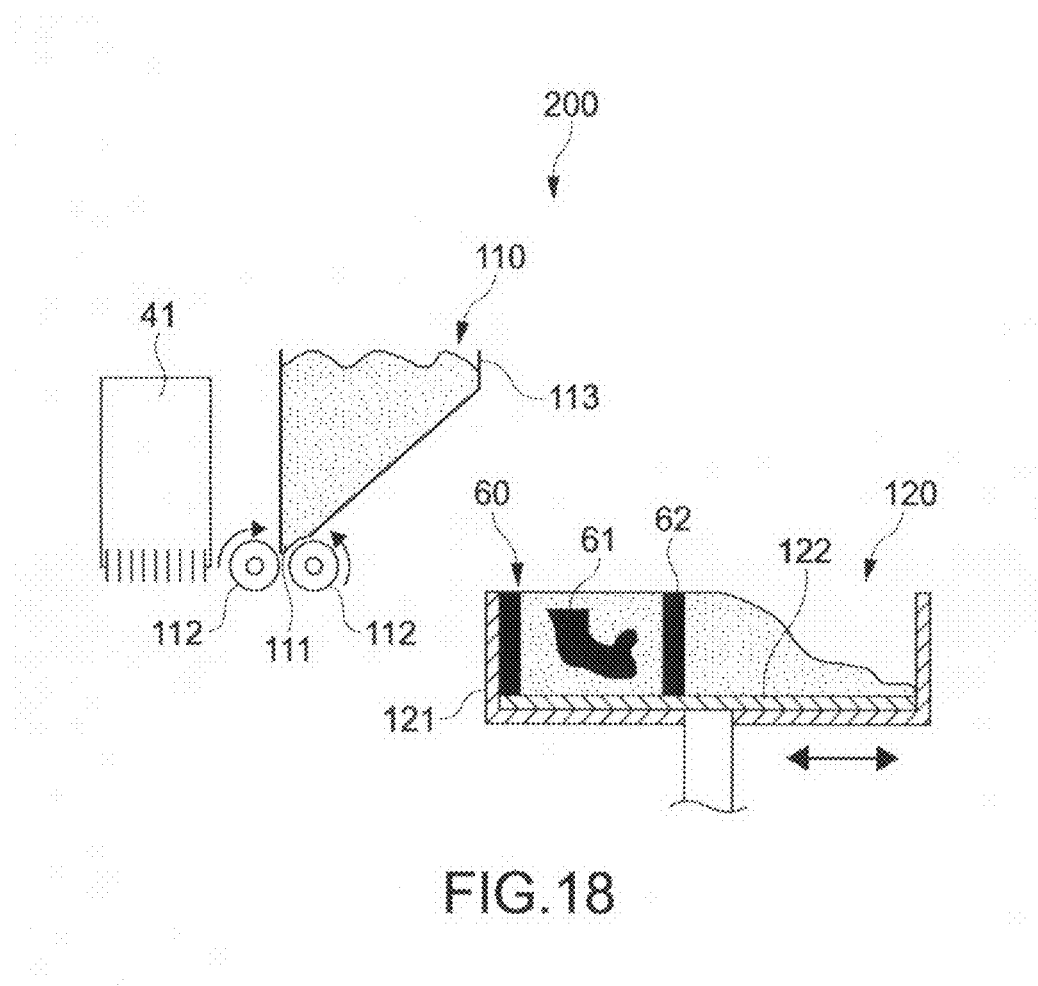
FIG. 18 is a view schematically showing a part of a 3-D modeling apparatus according to a third embodiment of the present invention.

FIG. 18 is a view schematically showing a part of a 3-D modeling apparatus according to a third embodiment of the present invention.

A 3-D modeling apparatus 200 includes the inkjet head 41 serving as a discharge mechanism, a supply unit 110 configured to store the powders 4, and a modeling unit 120. The modeling unit 120 is movable below a supply box 113 in a direction in which the inkjet head 41 and the supply unit 110 are arranged.

The supply unit 110 includes the supply box 113, a discharging port 111 for the powders 4, and supply rollers 112. The discharging port 111 is provided in a lower portion of the supply box 113. The supply rollers 112 are provided so as to be rotatable, and downwardly discharge the powders 4 through the discharging port 111 by self-weight of the powders 4. For example, two supply rollers 112 are provided, and those supply rollers 112 rotate in a direction opposite to each other.

The modeling unit 120 includes a modeling box 121 and a modeling stage 122 capable of lifting and lowering. The above-mentioned supply rollers 112 also have a function of leveling the powders on the modeling stage 122. That is, the supply rollers 112 rotate, while the modeling unit 120 is moving nearly below the supply box 113, so as to supply the powders 4 into the modeling box 121, and level the powders on the modeling stage 122.

In the 3-D modeling apparatus 200 configured in the above-mentioned manner, the powders 4 for substantially each layer are supplied by the supply unit 110 on the modeling stage 122, and ink is discharged through the inkjet head 41. The inkjet head 41 discharges the ink to the powders 4 so as to form the 3-D object 60 including the main body 61 and the frame body 62. The frame body 62 to be formed is not limited to the form shown in FIG. 6 and FIG. 7, and the frame according to each of the above-mentioned embodiments may be formed.

[Other Embodiments]

Embodiments according to the present invention are not limited to the above-mentioned embodiments, and other various embodiments can be made.

Although, for example, the frame body 62 shown in FIG. 6 and FIG. 7 is formed of the four sidewalls and does not have a bottom wall, the frame body 62 may have the bottom wall. In this case, the plate 22a shown in FIG. 8 may be omitted.

The frame body 62 shown in FIG. 6 and FIG. 7, and the frame body according to each of other embodiments described above have a function as the partition body 68 as shown in FIG. 17. In this case, for example, when a plurality of objects are to be formed, the modeling portion 20 may be partitioned by the partition body for the plurality of objects in a matrix manner.

In each of the above-mentioned embodiments, a mode in which the modeling stage 22 is lifted and lowered in the modeling portion 20 by the lifting and lowering cylinder 23 has been described. However, a mode in which the modeling stage 22 is fixed and the modeling box 21 lifts and lowers may be adopted. That is, it is sufficient that the volume of the deposition area for the powders 4 be changed.

The inkjet head 41 may be a linear type head configured to move only in one direction when discharging the ink, or may be a face type head immovable when discharging the ink. The face type head means a head having a range of discharging the ink, the range corresponding to a range within which an object is formed in modeling box 21, for example.

The ink discharged from the above-mentioned inkjet head 41 is color ink of CMY. However, in place of or in addition to the above-mentioned three colors of cyan, magenta, and yellow, ink of black and white or colorless color may be used. In particular, an inkjet head including a tank for the black ink, the white ink, or the colorless ink may be appropriately set correspondingly to the color of the powders 4 themselves.

The present application contains subject matter related to that disclosed in Japanese Priority Patent Application JP 2010-021139 filed in the Japan Patent Office on Feb. 2, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A three-dimensional modeling apparatus, comprising:
a supply mechanism configured to supply a powder material;
a modeling box defining at least in part a deposition area in which the powder material supplied by the supply mechanism is deposited, the modeling box having a vertically-extending first side, a vertically-extending second side facially opposing the first side and a modeling stage extending horizontally and between the first side and the second side;
a variable mechanism configured to vary a volume of the deposition area per a predetermined layer thickness so that the powder material is deposited per the predetermined layer thickness in the deposition area;
a discharge mechanism configured to discharge liquid for forming a three-dimensional object to the powder material deposited per the predetermined layer thickness in the deposition area, the liquid being capable of hardening the powder material; and
a control means for causing the discharge mechanism to discharge the liquid to the powder material, to thereby form a main body being an object being a target to be modeled and a frame body being an object formed to surround the main body of the three-dimensional object, the frame body commencing on and being in contact with the modeling stage and having a vertically-extending first frame body part disposed adjacent to the first side at a first distance and a vertically-extending second frame body part positioned opposite the first frame body part and disposed apart from the second side at a second distance being larger than the first distance.

2. The three-dimensional modeling apparatus according to claim 1, wherein
the supply mechanism includes
a supply box, which is arranged to be adjacent to the first side of the deposition area and is capable of storing the powder material, and
a conveying mechanism configured to convey the powder material stored in the supply box in such a manner that the powder material is more deposited in an area closer to the first side rather than the second side in an entire area of the deposition area.

3. The three-dimensional modeling apparatus according to claim 1, wherein
the discharge mechanism is capable of discharging ink of multiple colors as the liquid, and
the control means causes the discharge mechanism to discharge the ink of multiple colors to the powder material forming the frame body so that the frame body colored in the multiple colors is formed.

4. The three-dimensional modeling apparatus according to claim 1, wherein
the control means causes the discharge mechanism to discharge the liquid in such a manner that an outline of the frame body has an isotropic shape as viewed at least from a plane perpendicular to a direction in which the powder material is laminated.

5. The three-dimensional modeling apparatus according to claim 1, wherein
the control means causes the discharge mechanism to discharge the liquid, to thereby form a plurality of objects each including the frame body.

6. The three-dimensional modeling apparatus according to claim 1, further comprising
a camera configured to pick up an image of the formed frame body.

* * * * *